US007651964B2

(12) United States Patent
Thompson et al.

(10) Patent No.: US 7,651,964 B2
(45) Date of Patent: *Jan. 26, 2010

(54) FIBER-CONTAINING COMPOSITE AND METHOD FOR MAKING THE SAME

(75) Inventors: Gregory J. Thompson, Simpsonville, SC (US); David E. Wenstrup, Spartanburg, SC (US); Shah N. Huda, Doraville, GA (US)

(73) Assignee: Milliken & Company, Spartanburg, SC (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/205,688

(22) Filed: Aug. 17, 2005

(65) Prior Publication Data

US 2007/0042664 A1 Feb. 22, 2007

(51) Int. Cl.
*D04H 1/00* (2006.01)
*B32B 5/24* (2006.01)

(52) U.S. Cl. ....................... 442/361; 442/373; 428/218; 428/219; 428/220

(58) Field of Classification Search ......... 442/361–364, 442/373, 369
See application file for complete search history.

(56) References Cited

U.S. PATENT DOCUMENTS

| | | | | |
|---|---|---|---|---|
| 2,500,282 | A | 3/1950 | Francis, Jr. | |
| 2,543,101 | A | 2/1951 | Francis, Jr. | 442/278 |
| 3,041,703 | A | 7/1962 | Prell | 26/51.5 |
| 3,073,735 | A | 1/1963 | Till et al. | |
| 3,254,300 | A | 5/1966 | Prell | 324/68 |
| 3,688,804 | A | 9/1972 | Brown et al. | 139/1 |
| 3,740,797 | A | 6/1973 | Farrington | |
| 3,772,739 | A | 11/1973 | Lovgren | |
| 3,837,995 | A | 9/1974 | Floden | |

(Continued)

FOREIGN PATENT DOCUMENTS

| | | |
|---|---|---|
| EP | 1 456 834 | 11/1976 |

(Continued)

OTHER PUBLICATIONS

"Rieter Ultra Light™, A weight saving breakthrough in vehicle acoustics," Rieter Automotive Management AG 110.9e-AA-9/US.

(Continued)

*Primary Examiner*—Lynda Salvatore
(74) *Attorney, Agent, or Firm*—Cheryl J. Brickey

(57) ABSTRACT

A unitary, fiber-containing composite comprises (a) a first region comprising a plurality of first binder fibers and a plurality of bast fibers, (b) a second region disposed above the first region, the second region comprising a plurality of second binder fibers and a plurality of bast fibers, and (c) a transitional region disposed between the first region and the second region. The transitional region comprises concentrations of the first binder fiber, the second binder fiber, and the bast fiber. The concentration of the first binder fiber in the first transitional region is greatest proximate to the first region and least proximate to the second region, and the concentration of the second binder fiber and the bast fiber in the first transitional region is greatest proximate to the second region and least proximate to the first region. A method for producing a unitary, fiber-containing composite is also described.

18 Claims, 4 Drawing Sheets

U.S. PATENT DOCUMENTS

| | | | | |
|---|---|---|---|---|
| 4,018,646 | A | 4/1977 | Ruffo et al. | |
| 4,082,886 | A | 4/1978 | Butterworth et al. | 428/284 |
| 4,127,698 | A | 11/1978 | Shimizu et al. | |
| 4,194,037 | A | 3/1980 | Stoller | |
| 4,418,031 | A | 11/1983 | Doerer et al. | 264/241 |
| 4,435,468 | A | 3/1984 | Ten Eyck | |
| 4,474,846 | A | 10/1984 | Doerer et al. | |
| 4,568,581 | A | 2/1986 | Peoples, Jr. | 428/35 |
| 4,666,763 | A | 5/1987 | King et al. | |
| 4,714,647 | A | 12/1987 | Shipp, Jr. et al. | 428/212 |
| 4,840,832 | A | 6/1989 | Weinle et al. | |
| 4,863,797 | A | 9/1989 | Ichibori et al. | |
| 4,931,357 | A | 6/1990 | Marshall et al. | |
| 4,970,111 | A | 11/1990 | Smith, Jr. | |
| 5,001,331 | A | 3/1991 | Leestemaker | 235/375 |
| 5,039,431 | A | 8/1991 | Johnson et al. | |
| 5,079,074 | A | 1/1992 | Steagall et al. | |
| 5,108,678 | A | 4/1992 | Hirasaka et al. | 264/113 |
| 5,141,805 | A | 8/1992 | Nohara et al. | |
| 5,147,345 | A | 9/1992 | Young et al. | 604/378 |
| 5,173,355 | A | 12/1992 | Vock et al. | |
| 5,182,060 | A | 1/1993 | Berecz | 264/70 |
| 5,200,128 | A | 4/1993 | Kiss | 264/113 |
| 5,208,105 | A | 5/1993 | Ichibori et al. | |
| 5,348,796 | A | 9/1994 | Ichibori et al. | |
| 5,350,624 | A | 9/1994 | Georger et al. | |
| 5,399,423 | A | 3/1995 | McCullough et al. | |
| 5,407,739 | A | 4/1995 | McCullough et al. | |
| 5,409,573 | A | 4/1995 | Weeks | 162/145 |
| 5,458,960 | A | 10/1995 | Nieminen et al. | |
| 5,508,102 | A | 4/1996 | Georger et al. | |
| 5,537,718 | A | 7/1996 | Nagatsuka et al. | 19/302 |
| 5,558,832 | A | 9/1996 | Noel et al. | 264/510 |
| 5,571,604 | A | 11/1996 | Sprang et al. | 428/212 |
| 5,578,368 | A | 11/1996 | Forsten et al. | |
| 5,591,289 | A | 1/1997 | Souders et al. | |
| 5,614,285 | A | 3/1997 | Gardill | |
| 5,679,296 | A | 10/1997 | Kelman et al. | |
| 5,685,347 | A | 11/1997 | Graham et al. | 139/390 |
| 5,698,298 | A | 12/1997 | Jackson et al. | |
| 5,723,209 | A | 3/1998 | Borger et al. | |
| 5,733,635 | A | 3/1998 | Terakawa et al. | |
| 5,766,745 | A | 6/1998 | Smith et al. | |
| 5,817,408 | A | 10/1998 | Orimo et al. | |
| 5,856,243 | A | 1/1999 | Geirhos et al. | |
| 5,873,392 | A | 2/1999 | Meyer et al. | 139/113 |
| 5,916,507 | A | 6/1999 | Dabi et al. | |
| 5,942,288 | A | 8/1999 | Kajander | |
| 6,063,461 | A | 5/2000 | Hoyle et al. | |
| 6,066,388 | A | 5/2000 | Van Kerrebrouck | |
| 6,074,505 | A | 6/2000 | Ouellette et al. | 156/148 |
| 6,110,848 | A | 8/2000 | Bouchette | 442/384 |
| 6,127,021 | A | 10/2000 | Kelman | |
| 6,177,370 | B1 | 1/2001 | Skoog et al. | 442/387 |
| 6,204,207 | B1 | 3/2001 | Cederblad et al. | 442/5 |
| 6,271,270 | B1 | 8/2001 | Muzzy et al. | 521/48 |
| 6,322,658 | B1 | 11/2001 | Byma et al. | |
| 6,346,491 | B1 | 2/2002 | DeAngelis et al. | |
| 6,364,976 | B2 | 4/2002 | Fletemier et al. | |
| 6,494,362 | B1 | 12/2002 | Harmon | 235/375 |
| 6,572,723 | B1 | 6/2003 | Tilton et al. | |
| 6,582,639 | B2 | 6/2003 | Nellis | |
| 6,586,353 | B1 | 7/2003 | Kiik et al. | |
| 6,609,261 | B1 | 8/2003 | Mortensen et al. | |
| 6,610,904 | B1 | 8/2003 | Thomas et al. | 604/383 |
| 6,689,242 | B2 | 2/2004 | Bodaghi | |
| 6,702,914 | B2 | 3/2004 | North et al. | |
| 6,718,583 | B1 | 4/2004 | Diaz | |
| 6,734,335 | B1 * | 5/2004 | Graef et al. | 604/365 |
| 6,736,915 | B2 | 5/2004 | Gebreselassie et al. | |
| 6,756,332 | B2 | 6/2004 | Sandoe et al. | |
| 6,764,971 | B2 | 7/2004 | Kelly et al. | |
| 6,774,068 | B2 | 8/2004 | Park | |
| 6,781,027 | B2 | 8/2004 | Fenwick et al. | |
| 6,797,653 | B2 | 9/2004 | Fay | |
| 6,936,554 | B1 | 8/2005 | Singer et al. | 442/327 |
| 7,137,477 | B2 | 11/2006 | Keller et al. | 181/286 |
| 7,318,498 | B2 | 1/2008 | Woodman et al. | 181/290 |
| 2001/0037854 | A1 | 11/2001 | Byma et al. | |
| 2003/0022581 | A1 * | 1/2003 | Tsai et al. | 442/364 |
| 2003/0087572 | A1 | 5/2003 | Balthes et al. | |
| 2003/0100239 | A1 | 5/2003 | Gaffney et al. | |
| 2003/0106560 | A1 | 6/2003 | Griesbach et al. | |
| 2003/0162461 | A1 | 8/2003 | Balthes | |
| 2003/0199216 | A1 | 10/2003 | Gomez et al. | 442/327 |
| 2003/0200991 | A1 | 10/2003 | Keck et al. | |
| 2003/0224145 | A1 | 12/2003 | Campion et al. | |
| 2003/0224679 | A1 | 12/2003 | Ahluwalis | |
| 2003/0228460 | A1 | 12/2003 | Ahluwalis | |
| 2004/0023586 | A1 | 2/2004 | Tilton | 442/381 |
| 2004/0048542 | A1 * | 3/2004 | Thomaschefsky et al. | 442/389 |
| 2004/0060118 | A1 | 4/2004 | Diaz | |
| 2004/0060119 | A1 | 4/2004 | Murphy et al. | |
| 2004/0062912 | A1 | 4/2004 | Mason et al. | |
| 2004/0091705 | A1 | 5/2004 | Hanyon et al. | |
| 2004/0097159 | A1 | 5/2004 | Balthes et al. | |
| 2004/0102112 | A1 | 5/2004 | McGuire et al. | |
| 2004/0106347 | A1 | 6/2004 | McGuire et al. | |
| 2004/0158928 | A1 | 8/2004 | Gladney | |
| 2004/0185239 | A1 | 9/2004 | Nakamura et al. | |
| 2004/0185731 | A1 | 9/2004 | McGuire | |
| 2004/0198125 | A1 | 10/2004 | Mater et al. | |
| 2004/0235983 | A1 | 11/2004 | Stadler et al. | |
| 2004/0242107 | A1 | 12/2004 | Collins | |
| 2004/0242109 | A9 | 12/2004 | Tilton et al. | |
| 2004/0259451 | A1 | 12/2004 | Paradis et al. | |
| 2005/0020164 | A1 | 1/2005 | Nakamura et al. | |
| 2005/0023509 | A1 | 2/2005 | Bascom et al. | |
| 2005/0026527 | A1 | 2/2005 | Schmidt et al. | |
| 2005/0026528 | A1 | 2/2005 | Forsten et al. | |
| 2005/0148268 | A1 | 7/2005 | Tai | 442/414 |
| 2005/0170726 | A1 | 8/2005 | Brunson et al. | |
| 2005/0170728 | A1 | 8/2005 | Crainic | 442/327 |
| 2005/0176327 | A1 | 8/2005 | Wenstrup et al. | |
| 2006/0063458 | A1 | 3/2006 | McGuire | |
| 2006/0068675 | A1 | 3/2006 | Handermann et al. | |
| 2006/0099393 | A1 | 5/2006 | Woodman et al. | 428/292.1 |
| 2006/0105661 | A1 | 5/2006 | Steinbach | 442/327 |
| 2006/0182940 | A1 | 8/2006 | Cline | |
| 2007/0042658 | A1 | 2/2007 | Cline et al. | 442/136 |

FOREIGN PATENT DOCUMENTS

| | | | |
|---|---|---|---|
| EP | 0 393 450 | A1 | 4/1990 |
| EP | 0 622 332 | B1 | 7/1998 |
| EP | 1 400 328 | A1 | 3/2004 |
| JP | 59-192754 | | 11/1984 |
| JP | 4163254 | | 6/1992 |
| JP | 5213138 | | 8/1993 |
| JP | 06-200460 | | 7/1994 |
| JP | 07-040487 | | 2/1995 |
| JP | 08-506148 | | 2/1996 |
| JP | 8060530 | | 3/1996 |
| JP | 08-108439 | | 4/1996 |
| JP | 08-323903 | | 12/1996 |
| JP | 09-216303 | | 8/1997 |
| JP | 09-220784 | | 8/1997 |
| JP | 09-313832 | | 12/1997 |
| JP | 10-110371 | | 4/1998 |
| JP | 10-147191 | | 6/1998 |
| JP | 10-180023 | | 7/1998 |
| JP | 10-236204 | | 9/1998 |
| JP | 10-236205 | | 9/1998 |
| JP | 10-236238 | | 9/1998 |

| | | | |
|---|---|---|---|
| JP | 10-245760 | | 9/1998 |
| JP | 10-95060 | | 10/1998 |
| JP | 11-058571 | | 3/1999 |
| JP | 11-061616 | | 3/1999 |
| JP | 11-217756 | | 8/1999 |
| JP | 11-268596 | | 10/1999 |
| JP | 2000-211417 | | 8/2000 |
| JP | 2001-232708 | | 8/2001 |
| JP | 2002-526296 | | 8/2002 |
| JP | 2003-305789 | | 10/2003 |
| JP | 2004-217052 | | 8/2004 |
| JP | 2004-524453 | | 8/2004 |
| JP | 2004-346436 | | 12/2004 |
| JP | 2004-360089 | A | 12/2004 |
| JP | 2005-053035 | | 3/2005 |
| WO | WO 02/076630 | A1 | 10/2002 |
| WO | WO 03/023108 | A1 | 3/2003 |
| WO | WO 2005/001187 | A1 | 1/2005 |
| WO | WO 2005/066396 | A1 | 7/2005 |
| WO | WO 2006/083144 | A1 | 8/2006 |
| WO | WO 2006/091031 | A1 | 8/2006 |
| WO | WO 2006/124305 | A1 | 11/2006 |

OTHER PUBLICATIONS

Blaga, A "Les thermoplastiques," *Digests de la construction au Canada*, Sep. 1975, Institut de la Recherche en Construction.

Additives—Reinforcing Polypropylene with Natural Fibers. Plastics Engineering / Apr. 1994. Anand R. Sanadi—Department of Forestry, University of Wisconsin, Madison, Wisconsin. Daniel F. Caulfield and Roger M. Rowell, Forest Products Laboratory—U.S. Department of Agriculture, Madison, Wisconsin.

1995 American Chemical Society. Ind. Eng. Chem. Res. 1995, 34, 1889-1896. Renewable Agricultural Fibers as Reinforcing Fillers in Plastics: Mechanical Properties of Kenaf Fiber-Polypropylene Composites. Anand R. Sanadi, Daniel F. Caulfield, Rodney E. Jacobson, and Roger M. Rowell. Department of Forestry, University of Wisconsin, 1630 Linden Drive, Madison, Wisconsin 53706, and Forest Products Laboratory, USDA, 1 Gifford Pinchot Drive, Madison, Wisconsin 53705.

National Renewable Energy Laboratory, Golden, Colorado. Proceedings—Second Biomass Conference of the Americas: Energy, Environment, Agriculture, and Industry. Aug. 21-24, 1995, Portland, Oregon.

Science and Technology of Polymers and Advanced Materials. Edited by P.N. Prasad et al., Plenum Press, New York, 1998. Property Enhanced Natural Fiber Composite Materials Based on Chemical Modification. Roger M. Rowell. USDA Forest Service, Forest Products Laboratory, One Gifford Pinchot Drive, Madison, WI 53705-2366 and Department of Biological Systems Engineering, University of Wisconsin, Madison, WI 63706.

Science and Technology of Polymers and Advanced Materials Edited by P.N. / Prasad et al., Plenum Press, New York, 1998. Economic Opportunities in Natural Fiber-Thermoplastic Composites. Roger M. Rowell. USDA Forest Products Laboratory, One Gifford Pinchot Drive, Madison, WI 53705-2366 and Department of Biological Systems Engineering, University of Wisconsin, Madison, WI 63706.

Plastics Technology Online Article—Natural Fibers: The New Fashion in Automotive Plastics—Oct. 1999. By Lilli Manolis Sherman, Senior Editor.

* cited by examiner

FIG. −2−

FIBER-CONTAINING COMPOSITE AND METHOD FOR MAKING THE SAME

FIELD OF THE INVENTION

The present invention relates to fiber-containing composites (e.g., natural fiber-containing composites), materials formed therewith, and methods for making the same.

BRIEF SUMMARY OF THE INVENTION

A unitary, fiber-containing composite is described herein. In a first embodiment, the unitary, fiber-containing composite comprises a first region, a second region disposed above the first region, and a first transitional region disposed between the first region and the second region. The first region comprises a plurality of first thermoplastic binder fibers and a plurality of bast fibers, and the second region comprises a plurality of second binder fibers and a plurality of bast fibers. The first transitional region comprises concentrations of the first binder fiber, the second binder fiber, and the bast fiber. The concentration of the first binder fiber in the first transitional region is greatest proximate to the first region and least proximate to the second region, and the concentration of the second binder fiber in the first transitional region is greatest proximate to the second region and least proximate to the first region.

In another embodiment, the composite comprises a third region disposed above the second region, the third region comprising a binder material. In certain embodiments, the binder material in the third region comprises a third binder fiber, and the composite comprises a second transitional region disposed between the second region and the third region. In this embodiment, the second transitional region comprises concentrations of the second binder fiber, the bast fiber, and the third binder fiber. The concentration of the second binder fiber in the second transitional region is greatest proximate to the second region and least proximate to the third region, and the concentration of the third binder fiber in the second transitional region is greatest proximate to the third region and least proximate to the second region.

In a further embodiment of the unitary, fiber-containing composite described herein, the composite comprises a fourth region disposed above the third region, a third transitional region disposed between the third region and the fourth region, a fifth region disposed above the fourth region, and a fourth transitional region disposed between the fourth region and the fifth region. The fourth region comprises a plurality of the second binder fibers and a plurality of the bast fibers, and the fifth region comprises the first binder material and a plurality of the bast fibers. The third transitional region comprises concentrations of the second binder fiber, the bast fiber, and the third binder fiber. The concentration of the third binder fiber in the third transitional region is greatest proximate to the third region and least proximate to the fourth region, and the concentration of the second binder fiber in the third transitional region is greatest proximate to the fourth region and least proximate to the third region. The fourth transitional region comprises concentrations of the second binder fiber, the bast fiber, and the first binder fiber. The concentration of the second binder fiber in the fourth transitional region is greatest proximate to the fourth region and least proximate to the fifth region, and the concentration of the first binder fiber in the fourth transitional region is greatest proximate to the fifth region and least proximate to the fourth region.

A method for producing a unitary, fiber-containing composite is also described herein. In one embodiment, the method comprises the steps of providing a plurality of first binder fibers having a first linear density, a plurality of second binder fibers having a second linear density, and a plurality of bast fibers. The pluralities of first binder fibers, second binder fibers, and bast fibers are then blended to produce a fiber blend, and the fiber blend is then projected onto a moving belt such that a unitary, fiber-containing composite is formed. In this method, the second linear density can be greater than the first linear density, such that the fibers are deposited onto the moving belt in regions or strata comprising different relative concentrations of the fibers.

In a further embodiment of the method described herein, the first step comprises providing a plurality of third binder fibers having a third linear density, and the second step comprises blending the pluralities of first, second, and third binder fibers and the bast fibers to produce the fiber blend. The resulting fiber blend is then projected onto the moving belt in the same or similar manner as that utilized in the first method embodiment. In this embodiment, the third linear density can be greater than the first and second linear densities.

In another embodiment of the method described herein, the method further comprises the step of passing heated air through the unitary, fiber-containing composite produced by the above-described embodiments to at least partially melt the first, second, and third binder fibers.

In another embodiment of the method described herein, the method further comprises the steps of heating the unitary, fiber-containing composite produced in the above-described embodiments to further melt the first, second, and third binder fibers and compressing the composite to retain the fibers contained therein in a compressed state.

In a further embodiment of the method described herein, the method comprises the step of cutting the unitary, fiber-containing composite along a plane that is parallel to the z-direction of the composite to produce at least a first section and a second section. The first section is then placed on top of the second section, and the stacked sections are simultaneously compressed and heated. The first and second sections produced by the cutting step each comprise the first region, first transitional region, second region, second transitional region, and third region of the unitary, fiber-containing composite from which they are cut, and the first section is placed on top of the second section so that the first region of the first section opposes the first region of the second section or the third region of the first section opposes the third region of the second section. In the heating step, the first, second, and third binder fibers contained in the sections are further melted, and the opposing regions of the first and second sections are fused together. The composite is then compressed in order to retain the fibers in the first and second sections in a compressed state.

DETAILED DESCRIPTION OF THE INVENTION

A unitary, fiber-containing composite is described herein. As utilized herein with reference to the fiber-containing composite, the term "unitary" refers to the fact that the enumerated regions of the composite do not form layers having distinct boundaries separating them from the adjacent region(s). Rather, the enumerated regions are used to refer to portions of the composite in which the different fibers are contained in different concentrations. More specifically, the enumerated regions are used to refer to portions of the thickness of the composite in which different fibers predominate or in which the concentration gradient of the fibers (e.g., how the concentration of a particular fiber changes with the thickness of the composite) differs from the adjacent portions (i.e., portions above and/or below) of the composite. Furthermore, while the composite will be described herein as containing particular fibers in specific regions, those of ordinary skill in the art will appreciate that each region of the composite can contain any of the fibers present in the composite. Nevertheless, particular fibers or combinations of fibers will predominate in particular portions of the thickness of the composite, and the enumerated regions described herein are intended to refer to those portions of the composite.

Figure 1:
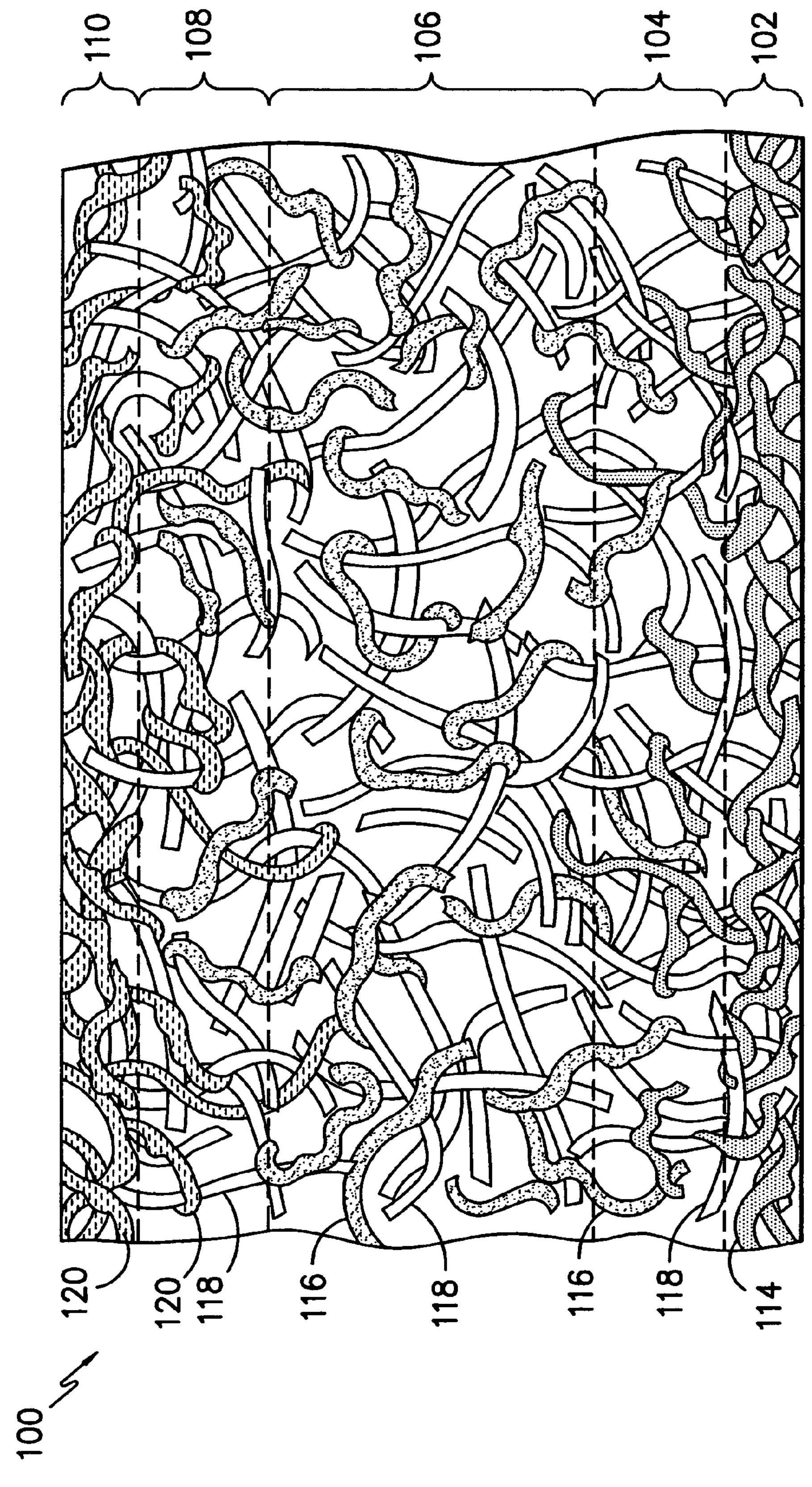
FIG. 1 is a cross-sectional view of a unitary, fiber-containing composite described in the current specification.

As depicted in FIG. 1, one embodiment of the unitary, fiber-containing composite 100 comprises a first region 102, a second region 106 disposed above the first region 102, a first transitional region 104 disposed between the first region 102 and the second region 106, and a third region 110 disposed above the second region 106. The first region 102 comprises a binder material, which is depicted as a plurality of first binder fibers 114, and a plurality of bast fibers 118, the second region 106 comprises a plurality of second binder fibers 116 and a plurality of the bast fibers 118, and the third region 110 comprises a plurality of third binder fibers 120 and a plurality of the bast fibers 118. The first transitional region 104 comprises concentrations of the first binder fiber 114, the second binder fiber 116, and the bast fiber 118. The concentration of the first binder fiber 114 in the first transitional region 104 is greatest proximate to the first region 102 and least proximate to the second region 106, and the concentration of the second binder fiber 116 in the first transitional region 104 is greatest proximate to the second region 106 and least proximate to the first region 102.

As utilized herein, the term "bast fiber" refers to strong woody fibers obtained chiefly from the phloem of plants. Suitable bast fibers include, but are not limited to, jute, kenaf, hemp, flax, ramie, roselle, and combinations thereof. Other suitable bast fibers include, but are not limited to, leaf fibers (e.g., fibers derived from sisal, banana leaves, grasses (e.g., bamboo), or pineapple leaves), straw fibers (e.g., fibers derived from wheat straw, rice straw, barley straw, or sorghum stalks), and husk fibers (e.g., fibers derived from corn husk, bagasse (sugar cane), or coconut husk). In certain embodiments, the bast fiber is jute. The fiber-containing composite can contain any suitable amount of the bast fiber(s). For example, the bast fibers can comprise about 30 to about 70 wt. %, about 30 to about 60 wt. %, or about 60 wt. % of the total weight of the fiber-containing composite. The bast fibers suitable for use in the disclosed fiber-containing composite and method can have any suitable linear density (i.e., denier). For example, the bast fibers can have a linear density of about $8.\overline{8}$ dtex (8 denier) to about 20 dtex (18 denier).

The binders contained in the fiber-containing composite can be any suitable binder material. For example, the binder materials can be a thermoplastic material that is capable of at least partially melting when heated so that the fibers contained within the composite will be bonded together. Suitable thermoplastic binder materials include, but are not limited to, polyesters (e.g., polyethylene terephthalate (PET) or glycol-modified PET (PETG)), polyamides (e.g., nylon 6 or nylon 6,6), polyethylenes (e.g., high density polyethylene (HDPE) or linear low density polyethylene (LLDPE)), polypropylenes, polylactic acid, poly(1,4-cyclohexanedimethylene terephthalate) (PCT), and combinations thereof.

As noted above, the binder material contained in the unitary, fiber-containing composite can be provided in the form of binder fibers. The binder fibers contained in the fiber-containing composite can be any suitable binder fibers. For example, the binder fibers can comprise a thermoplastic material that is capable of at least partially melting when heated, thereby providing a means by which the binder fibers and bast fibers can become interconnected within the fiber-containing composite. Suitable thermoplastic binder fibers include polyester fibers (e.g., polyethylene terephthalate (PET) fibers or glycol-modified PET (PETG) fibers), polyamide fibers (e.g., nylon 6 or nylon 6,6), polyethylene fibers (e.g., fibers containing high density polyethylene (HDPE) or linear low density polyethylene (LLDPE)), polypropylene fibers, polylactic acid fibers, fibers containing poly(1,4-cyclohexanedimethylene terephthalate) (PCT), cellulose fibers (e.g., rayon fibers), fibers containing 1,3-propanediol terephthalate, and combinations thereof. Suitable binder fibers also include, but are not limited to, bicomponent binder fibers (e.g., bicomponent binder fibers comprising a thermoplastic sheath) and thermoplastic binder fibers having a relatively low melt flow rate. Suitable bicomponent fibers include bicomponent, sheath-core fibers in which the sheaths have a lower melting point than the cores of the fibers. For example, the bicomponent, sheath-core fiber can have a polyethylene sheath (e.g., a high density polyethylene sheath) and a polypropylene or polyester core. Other suitable bicomponent fibers include fibers having a PET copolymer sheath and a PET core, a PCT sheath and polypropylene core, a PCT sheath and a PET core, a PETG sheath and a PET core, a HDPE sheath and a PET core, a HDPE sheath and a polypropylene core, a LLDPE sheath and a PET core, a polypropylene sheath and a PET core, or a nylon 6 sheath and a nylon 6,6 core. When such fibers are used in the disclosed composite, the composite can be heated so that the sheaths of the bicomponent fibers are melted to provide links between adjacent fibers within the composite, while the cores of the bicomponent fiber retain their fibrous structure. As noted above, the binder fibers can be thermoplastic binder fibers in which the thermoplastic material has a relatively low melt flow rate. For example, the melt flow rate of the thermoplastic fibers can be about 18 g/10 min. or less (e.g., about 8 g/10 min.), as determined in accordance with, for example, ASTM Standard D1238 entitled "Standard Test Method for Melt Flow Rates of Thermoplastics by Extrusion Plastometer." When such fibers are used in the disclosed composite, the composite can be heated so that the thermoplastic binder fibers are at least partially melted to provide links between adjacent fibers, while the relatively low melt flow rate of the thermoplastic material allows the binder fibers to retain their fibrous structure.

The binder fibers contained in the fiber-containing composite can have any suitable linear density or combination of linear densities. In certain embodiments, each of the different binder fiber types contained in the composite can have different linear densities. For example, as depicted in FIG. 1, the first binder fiber 114 can have a linear density that is less than the linear density of the second binder fiber 116. In such an embodiment, the first binder fiber 114 can have a linear density of about $6.\overline{6}$ dtex (6 denier) or less (e.g., about $0.\overline{5}$ dtex (0.5 denier) to about $6.\overline{6}$ dtex (6 denier)), and the second binder fiber 116 can have a linear density of about $6.\overline{6}$ dtex (6 denier) to about $22.\overline{2}$ dtex (22 denier). In certain embodiments, the first binder fiber can have a linear density of about $1.\overline{6}$ dtex (1.5 denier), and the second binder fiber can have a linear density of about $11.\overline{1}$ dtex (10 denier). The fiber-containing composite described herein can comprise any suitable amount of binder fibers. For example, the binder fibers can comprise about 30 to about 70 wt. %, about 30 to about 60 wt. %, or about 40 wt. % of the total weight of the composite.

The binder material contained in the third region can be any suitable binder material. For example, the binder material can comprise a layer of thermoplastic material that has been laminated to the upper surface of the second region. Such a layer can be formed, for example, by depositing thermoplastic particles onto the upper surface of the second region and at least partially melting the particles to bond them to the fibers contained in the second region. As depicted in FIG. 1, the binder material in the third region 110 can comprise a third binder fiber 120, and the composite 100 can comprise a second transitional region 108 disposed between the second region 106 and the third region 110. In this embodiment, the second transitional region 108 comprises concentrations of the second binder fiber 116, the bast fiber 118, and the third binder fiber 120. The concentration of the second binder fiber 116 in the second transitional region 108 is greatest proximate to the second region 106 and least proximate to the third region 110, and the concentration of the third binder fiber 120 in the second transitional region 108 is greatest proximate to the third region 110 and least proximate to the second region 106.

The binder fibers suitable for use in the above-described third region 110 of the composite 100 can be any suitable binder fibers, including those described above as suitable for use as the first and second binder fibers. As with the first and second binder fibers, the third binder fibers can have any suitable linear density. In certain embodiments, the third binder fibers 120 have a linear density that is greater than the linear density of the first and second binder fibers 114, 116. For example, the third binder fibers 120 can have a linear density of about $22.\overline{2}$ dtex (22 denier) or more (e.g., about $22.\overline{2}$ dtex (22 denier) to about $72.\overline{2}$ dtex (65 denier)). In certain embodiments, the third binder fibers can have a linear density of about $35.\overline{5}$ dtex (32 denier).

The unitary, fiber-containing composite described herein can have any suitable weight and density. For example, the composite can have a weight of about 500 to about 2000 g/m$^2$, about 500 to about 1500 g/m$^2$, or about 600 to about 1200 g/m$^2$. In certain embodiments, the unitary, fiber-containing composite can have a density of about 0.08 to about 2 g/cm$^3$, about 0.08 to about 1.5 g/cm$^3$, about 0.2 to about 1.5 g/cm$^3$, about 0.2 to about 0.7 g/cm$^3$, or about 0.25 to about 0.6 g/cm$^3$.

Figure 2:
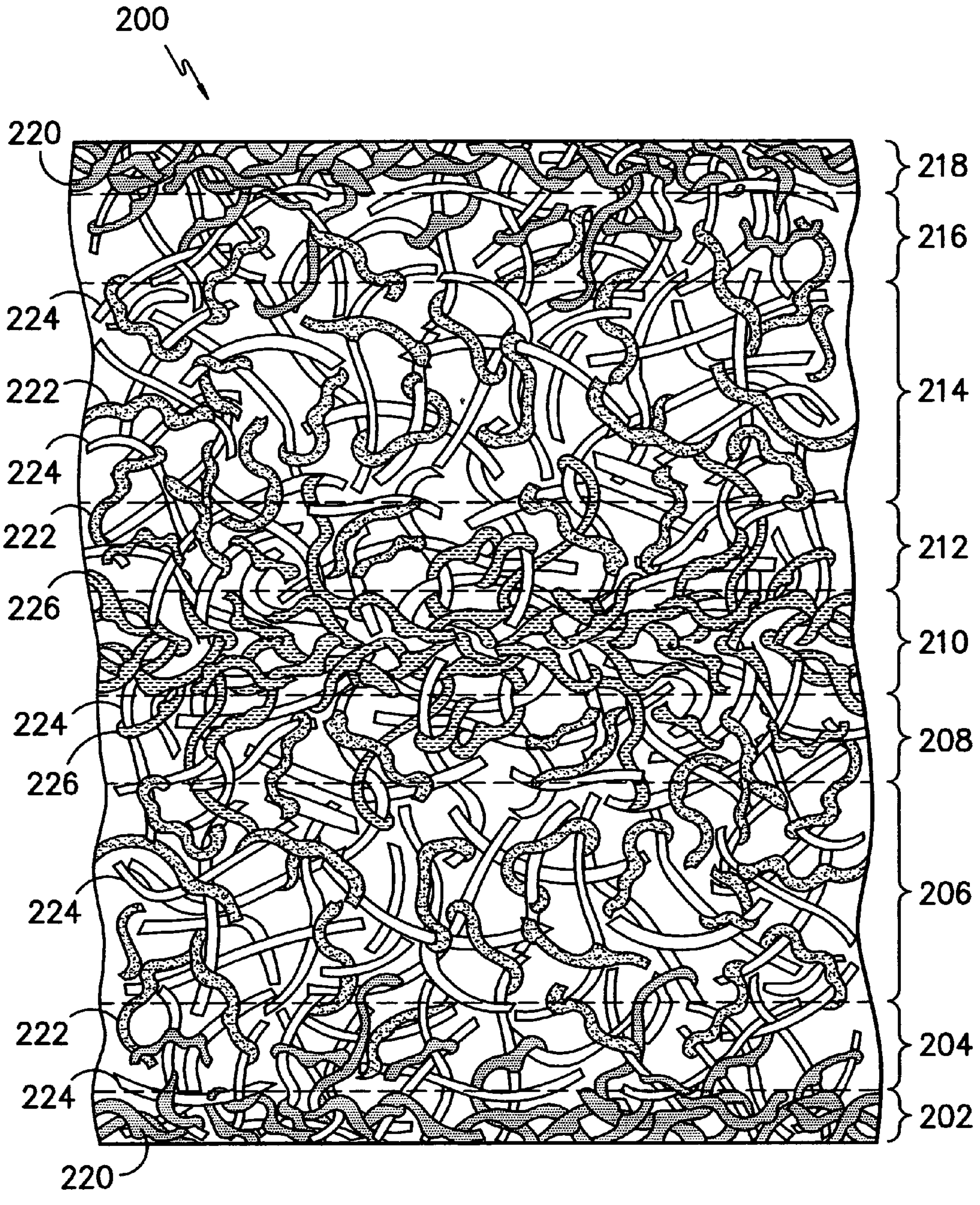
FIG. 2 is a cross-sectional view of a unitary, fiber-containing composite described in the current specification.
Figure 3:
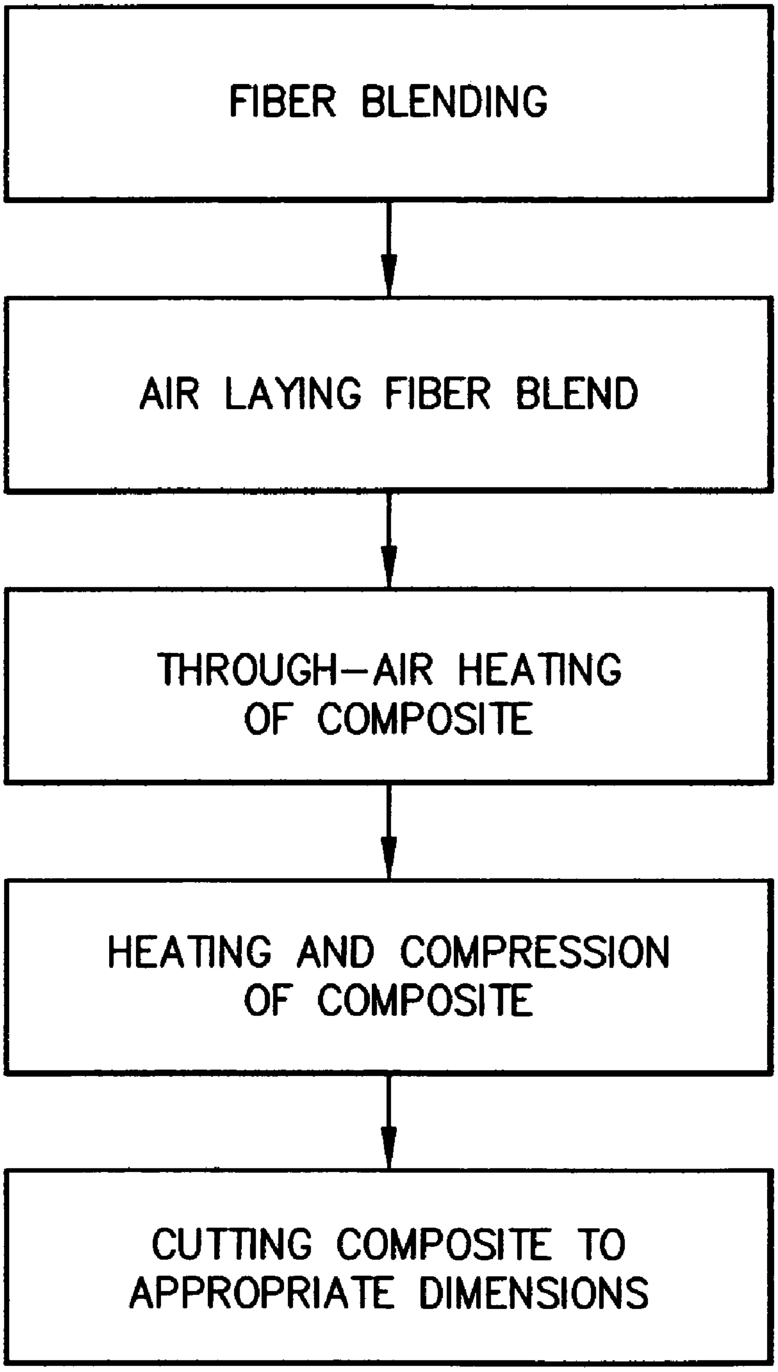
FIG. 3 is a flow diagram depicting the steps of a method for making a unitary, fiber-containing composite.

In a further embodiment of the unitary, fiber-containing composite described herein, the composite comprises fourth and fifth regions and third and fourth transitional regions disposed above the third region of the composite. In such an embodiment, the additional layers of the composite (i.e., the fourth and fifth regions and third and fourth transitional regions) can resemble mirror images of the first and second regions and first and second transitional regions of the composite described above. For example, as depicted in FIG. 2, such a composite 200 comprises a first region 202, a first transitional region 204, a second region 206, a second transitional region 208, and a third region 210 similar to those of the embodiment depicted in FIG. 1. In particular, the first region 202 comprises a plurality of first binder fibers 220 and a plurality of bast fibers 224, the second region 206 comprises a plurality of second binder fibers 222 and a plurality of the bast fibers 224, and the third region 210 comprises a plurality of third binder fibers 226 and a plurality of the bast fibers 224. The first transitional region 204 comprises concentrations of the first binder fiber 220, the second binder fiber 222, and the bast fiber 224. The concentration of the first binder fiber 220 in the first transitional region 204 is greatest proximate to the first region 202 and least proximate to the second region 206, and the concentration of the second binder fiber 222 in the first transitional region 204 is greatest proximate to the second region 206 and least proximate to the first region 202.

In addition to these regions, the composite 200 further comprises a fourth region 214 disposed above the third region 210, a third transitional region 212 disposed between the third region 210 and the fourth region 214, a fifth region 218 disposed above the fourth region 214, and a fourth transitional region 216 disposed between the fourth region 214 and the fifth region 218. As shown in FIG. 2, the fourth region 214 comprises a plurality of the second binder fibers 222 and a plurality of the bast fibers 224, and the fifth region 218 comprises a plurality of the first binder fibers 220 and a plurality of the bast fibers 224. The third transitional region 212 comprises concentrations of the second binder fiber 222, the bast fiber 224, and the third binder fiber 226. The concentration of the third binder fiber 226 in the third transitional region 212 is greatest proximate to the third region 210 and least proximate to the fourth region 214, and the concentration of the second binder fiber 222 in the third transitional region 212 is greatest proximate to the fourth region 214 and least proximate to the third region 210. The fourth transitional region 216 comprises concentrations of the second binder fiber 222, the bast fiber 224, and the first binder fiber 220. The concentration of the second binder fiber 222 in the fourth transitional region 216 is greatest proximate to the fourth region 214 and least proximate to the fifth region 218, and the concentration of the first binder fiber 220 in the fourth transitional region 216 is greatest proximate to the fifth region 218 and least proximate to the fourth region 214.

The unitary, fiber-containing composite can comprise other fibers in addition to those enumerated above. For example, in order to increase the flame resistance of the resulting composite, the composite can further comprise flame retardant fibers. As utilized herein, the term "flame retardant fibers" refers to fibers having a Limiting Oxygen Index (LOI) value of about 20.95 or greater, as determined by ISO 4589-1. Alternatively, the fibers contained in the composite (e.g., the bast fibers and/or the binder fibers) can be treated with a flame retardant in order to increase the flame resistance of the composite. Also, in certain other embodiments, the composite can comprise fibers derived from animal sources, such as wool, silk, or feathers (e.g., chicken feathers separated from the quill), in addition to or in place of the bast fibers.

The unitary, fiber-containing composite described above can be utilized in a variety of applications. For example, the composite can be used as the substrate for an automobile headliner, an automobile door panel, a panel used in office furniture, etc. In one embodiment, the composite comprises the structural support for an automobile headliner. In such an embodiment, the composite can have a fabric layer adhered to one surface with or without the use of an additional adhesive. For example, in certain embodiments, the binder material disposed on the surface of the composite can provide sufficient tack for the fabric to adhere to the surface of the composite. Such an automobile headliner can also comprise a layer of foam or other suitable material (e.g., batting) disposed between the composite and the fabric layer.

A method for producing a unitary, fiber-containing composite is also described herein. In one embodiment, the method comprises the steps of providing a plurality of first binder fibers having a first linear density, a plurality of second binder fibers having a second linear density, and a plurality of bast fibers. The pluralities of first binder fibers, second binder fibers, and bast fibers are then blended to produce a fiber blend, and the fiber blend is then projected onto a moving belt such that a unitary, fiber-containing composite is formed. In this method, the second linear density can be substantially equal to the third linear density and greater than the first linear density, such that the fibers are deposited onto the moving belt in regions or strata comprising different relative concentrations of the fibers.

Figure 4:
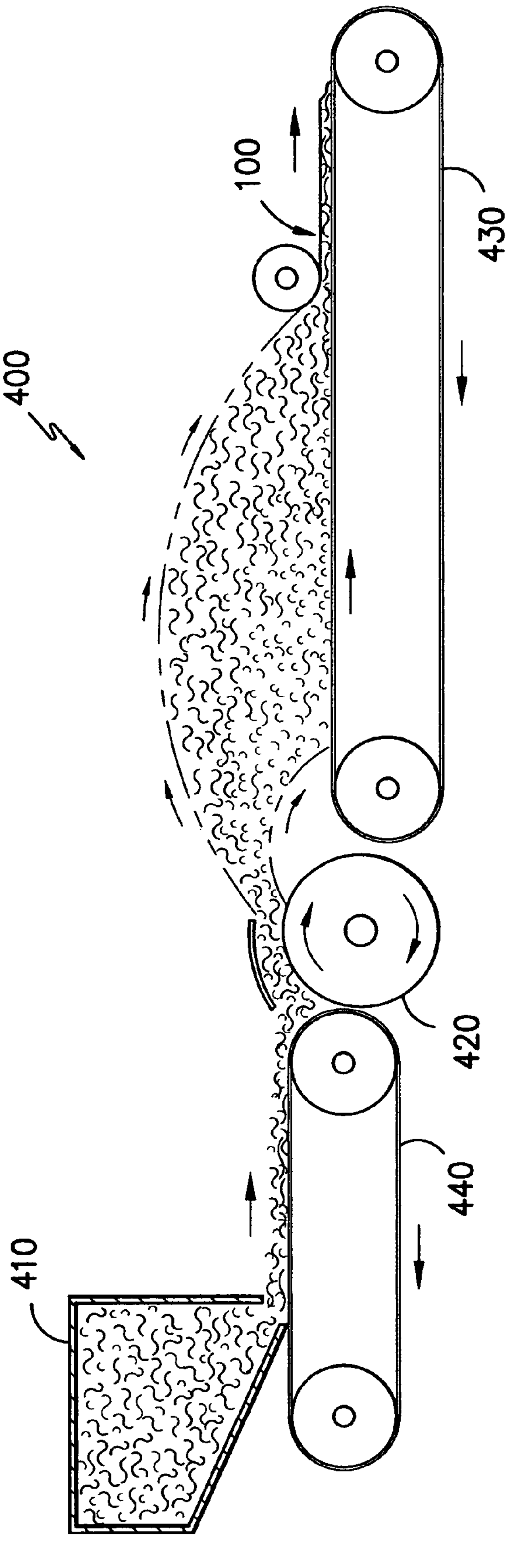
FIG. 4 is an elevation view of an apparatus suitable for performing the method described in the current specification.

An apparatus suitable for performing the above-described method is depicted in FIG. 4. A commercially available piece of equipment that has been found to be suitable for carrying out the above-described method is the "K-12 HIGH-LOFT RANDOM CARD" by Fehrer AG (Linz, Austria). In the apparatus 400 depicted in FIG. 4, the binder fibers and bast fibers are blended in the appropriate proportions and introduced into a feed chute 410. The feed chute 410 delivers the blended fibers to a transverse belt 440 that delivers a uniform thickness or batt of fibers to an air lay machine comprising a cylinder 420. The cylinder 420 rotates and slings the blended fibers towards a collection belt 430. The collection belt 430 typically comprises a plurality of perforations in its surface (not shown) so that a vacuum can be drawn across the belt which helps the fibers to properly settle on the collection belt 430. The rotation of the cylinder 420 slings the fibers having a higher linear density a further distance along the collection belt 430 than it slings the fibers having a lower linear density. As a result, the unitary, fiber-containing composite 100 collected on the collection belt 430 will have a greater concentration of the fibers with a lower linear density adjacent to the collection belt 430, and a greater concentration of the fibers with a higher linear density further away from the collection belt 430. In general, the larger the difference in linear density between the fibers, the greater the gradient will be in the distribution of the fibers.

In a further embodiment of the method described herein, the first step comprises providing a plurality of third binder fibers having a third linear density, and the second step comprises blending the pluralities of first, second, and third binder fibers and the bast fibers to produce the fiber blend. The resulting fiber blend is then projected onto the moving belt in the same or similar manner as that utilized in the first method embodiment. In this embodiment, the third linear density can be greater than the first and second linear densities.

The fibers suitable for use in the above-described methods can be any suitable binder fibers and bast fibers. For example, the first, second, third, and bast fibers suitable for use in the described methods can be the same as those discussed above with respect to the various embodiments of the unitary, fiber-containing composite.

In certain embodiments of the described methods, such as when at least one of the binder fibers is a thermoplastic binder fiber, the unitary, fiber-containing composite produced by the above-described steps can be heated to at least partially melt the thermoplastic binder fiber and bond together at least a portion of the fibers contained in the composite. For example, the method can further comprise the step of passing heated air through the unitary fiber-containing composite produced by the above-described embodiments to partially melt all or a portion of the binder fibers. As will be understood by those of ordinary skill in the art, the unitary fiber-containing composite can be heated by other means, such as infrared radiation. This step serves to set an initial thickness for the composite of, for example, about 5 to about 50 mm or about 10 to about 50 mm.

In another embodiment of the method described herein, the unitary, fiber containing composite can be compressed to produce a composite having a density and/or a rigidity that are high enough for the composite to act as a structural support, for example, for an automobile headliner. In such an embodiment, the method can further comprise the step of heating the unitary, fiber-containing composite produced in the above-described embodiments using, for example, a hot belt laminator, which concentrates heat on the surfaces of the composite. Such heating further melts the first, second, and third binder fibers, and the compressive forces exerted on the composite by the laminator serve to retain the fibers in a compressed state.

The unitary, fiber-containing composite can be further processed using convention "cold mold" thermoforming equipment in which the composite is first heated and then pressed to the appropriate shape and thickness using an unheated mold. In such an embodiment of the method, the composite can be heated to a temperature of about 170 to about 215° C. during a heating cycle of about 30 to about 120 seconds using, for example, infrared radiation. The heated composite is then placed inside a mold, which typically is maintained at a temperature of about 10 to about 30° C., and compressed to the appropriate shape and thickness. The compression step typically is about 1 minute in length, during which time the thermoplastic binder fibers will cool to such an extent that the composite will maintain substantially the compressed configuration upon removal from the mold. As will be understood those of ordinary skill in the art, owing at least partially to the rigidity of the bast fibers, the composite may expand (for example, in the z-direction) upon heating and before being placed in the mold.

In a further embodiment of the method described herein, the method comprises the step of cutting the unitary, fiber-containing composite along a plane that is parallel to the z-direction of the composite (i.e., the thickness of the composite) to produce at least a first section and a second section. The first section is then placed on top of the second section, and the stacked sections are heated and compressed. The first and second sections produced by the cutting step each comprise the first region, first transitional region, second region, second transitional region, and third region of the unitary, fiber-containing composite from which they are cut, and the first section is placed on top of the second section so that the first region of the first section opposes the first region of the second section or the third region of the first section opposes the third region of the second section. In the heating and compression step, the first, second, and third binder fibers contained in the sections are further melted, and the opposing regions of the first and second sections are fused together. The step of heating and then compressing the composite also serves to retain the fibers in the first and second sections in a compressed state.

The following example further illustrates the invention but, of course, should not be construed as in any way limiting its scope.

EXAMPLE

This example demonstrates a method for producing a unitary, fiber-containing composite as described above and the properties of a unitary, fiber-containing composite as described above. Three similar unitary, fiber-containing composites (Samples A-C) were produced by air laying a fiber blend using a K-12 HIGH-LOFT RANDOM CARD by Fehrer AG (Linz, Austria). In particular, the composites were produced from a fiber blend containing approximately 40 wt. % (based on the total weight of the fiber blend) of bicomponent binder fibers and approximately 60 wt. % of jute fibers, which had a linear density of approximately $8.\overline{8}$-2 dtex (8-18 denier). The binder fibers had a high-density polyethylene sheath (melting point of approximately 128° C.) and a polypropylene core (melting point of approximately 149° C.). The binder fiber content was comprised of three bicomponent binder fibers having three different linear densities. The first binder fibers, which comprised approximately 10 wt. % of the total weight of the fiber blend, had a linear density of approximately $1.\overline{6}$ dtex (1.5 denier). The second binder fibers, which comprised approximately 20 wt. % of the total weight of the fiber blend, had a linear density of approximately $11.\overline{1}$ dtex (10 denier). The third binder fibers, which comprised approximately 10 wt. % of the total weight of the fiber blend, had a linear density of approximately $35.\overline{5}$ dtex (32 denier).

As noted above, the above-described fiber blend was air laid using the K-12 HIGH-LOFT RANDOM CARD by projecting the fibers onto a moving belt. Due to the difference in denier between the fibers contained in the fiber blend, the composites produced by the air laying step contained a greater concentration of the $1.\overline{6}$ dtex (1.5 denier) binder fiber in a first region closest to the collection belt, a greater concentration of the $11.\overline{1}$ dtex (10 denier) binder fiber in a middle region, and a greater concentration of the $35.\overline{5}$ dtex (32 denier) binder fiber in an upper region. Following the air laying step, the resulting composites were passed through a through-air oven in which air heated to a temperature of approximately 175° C. (347° F.) was passed through the composite to partially melt the binder fibers.

Sample A was then produced by passing a composite, which had been laid so that it had a weight of approximately 1100 g/m$^2$, through a compression oven in which the belts were heated to a temperature of approximately 204° C. (400° F.). After passing through the compression oven, Sample A had a thickness of approximately 3.3 mm.

Samples B and C were produced by cutting two composites, which had been laid so that the composites had weights of approximately 537 g/m$^2$ and approximately 412 g/m$^2$, respectively, in the z-direction (i.e., along a plane parallel to the thickness of the composite) and stacking the resulting sections on top of each other so that the regions containing the greatest concentration of the $35.\overline{5}$ dtex (32 denier) binder fiber opposed each other. The stacked sections were then passed through a compression oven in which the belts were heated to a temperature of approximately 204° C. (400° F.). After passing through the compression oven, Sample B had a thickness of approximately 3.3 mm, and Sample C had a thickness of approximately 2.3 mm. Due to the stacking of the sections, Sample B had a weight of approximately 1075 g/m$^2$, and Sample C had a weight of approximately 825 g/m$^2$.

Samples A-C were then tested to determine their physical properties, such as the stiffness, strength, toughness, flammability, and sound absorption at different frequencies. The results of these measurements, including the test methods used to determine the properties, are set forth in the Table below.

TABLE

Physical properties of Samples A-C.

| Property | Test Method | Sample A | Sample B | Sample C |
|---|---|---|---|---|
| Thickness (mm) | — | 3.3 | 3.3 | 2.3 |
| Weight g/m$^2$ | FLTM BN 106-01 | 1100 | 1075 | 825 |
| Stiffness (N/mm) | ASTM D790 | 7.2 | 7.6 | 7.4 |
| Strength (N) | ASTM D790 | 19 | 18 | 9.9 |
| Toughness (%) | ASTM D790 | 130 | 106 | 120.7 |
| Flammability | ISO 3795/SAE J369 | 0.68 | 0.50 | 0.8 |
| Fogging | SAE J1756 | 99.5 | 100 | 100 |
| Odor | SAE J1341 (1 L jar) | Pass | Pass | Pass |
| Sound absorption at 1000 Hz (%) | ASTM E1050-98 (10 mm air gap) | 28.1% | 23.1% | 18.3% |
| Sound absorption at 1500 Hz (%) | ASTM E1050-98 (10 mm air gap) | 43.1% | 35.8% | 23.4% |
| Sound absorption at 2000 Hz (%) | ASTM E1050-98 (10 mm air gap) | 51.6% | 51.0% | 40.5% |
| Sound absorption at 2000 Hz (%) | ASTM E1050-98 (10 mm air gap) | 51.6% | 51.0% | 40.5% |
| Sound absorption at 2500 Hz (%) | ASTM E1050-98 (10 mm air gap) | 84.7% | 81.3% | 68.9% |
| Sound absorption at 3000 Hz (%) | ASTM E1050-98 (10 mm air gap) | 98.4% | 97.3% | 89.0% |

As can be seen from the results set forth in the Table above, Samples A-C exhibited physical properties which should render the composites suitable for use as, for example, the substrate for an automobile headliner, an automobile door panel, or a panel used in office furniture. In particular, the stiffness, strength, and toughness of the composites indicate that they should be able to span the width and/or length of a typical automobile passenger compartment without significant or observable sagging. In particular, the composites should be able to pass the climatic sag requirements of most automobile manufacturers. Furthermore, the sound absorption measurements demonstrate that the composites should be able to provide an amount of sound absorption that is desirable for certain applications, such as the substrate for an automobile headliner.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A unitary, fiber-containing composite comprising:

(a) a first region comprising a plurality of first thermoplastic binder fibers and a plurality of bast fibers;

(b) a second region disposed above the first region, the second region comprising a plurality of second thermoplastic binder fibers, and a plurality of bast fibers; and (c) a first transitional region disposed between the first region and the second region, the first transitional region comprising concentrations of the first binder fiber, the second binder fiber, and the bast fiber, the concentration of the first binder fiber in the first transitional region being greatest proximate to the first region and least proximate to the second region, and the concentration of the second binder fiber in the first transitional region being greatest proximate to the second region and least proximate to the first region, wherein the first binder fibers have a first linear density, the second binder fibers have a second linear density, and the second linear density is greater than the first linear density.

2. The unitary, fiber-containing composite of claim 1, wherein the first and second binder fibers are bicomponent, sheath-core fibers, the sheath having a first melting point, the core having a second melting point, and the first melting point is lower than the second melting point.

3. The unitary, fiber-containing composite of claim 2, wherein the sheaths of the bicomponent fibers comprise polyethylene, and the cores of the bi-component fibers comprise polypropylene.

4. The unitary, fiber-containing composite of claim 1, wherein the bast fiber is selected from the group consisting of jute, kenaf, hemp, flax, ramie, roselle, and combinations thereof.

5. The unitary, fiber-containing composite of claim 4, wherein the bast fiber is jute.

6. The unitary, fiber-containing composite of claim 1, wherein the first linear density is 6.6 dtex or less.

7. The unitary, fiber-containing composite of claim 1, wherein the second linear density is 6.6 dtex to 22.2 dtex.

8. The unitary, fiber-containing composite of claim 1, wherein the composite further comprises:

(d) a third region disposed above the second region, the third region comprising a plurality of third thermoplastic binder fibers and a plurality of bast fibers; and (e) a second transitional region disposed between the second region and the third region, the second transitional region comprising concentrations of the second binder fiber, the bast fiber, and the third binder fiber, the concentration of the second binder fiber in the second transitional region being greatest proximate to the second region and least proximate to the third region, and the concentration of the third binder fiber in the second transitional region being greatest proximate to the third region and least proximate to the second region, wherein the first binder fibers have a first linear density, the second binder fibers have a second linear density that is greater than the first linear density, and the third binder fibers have a third linear density that is greater than the first and second linear densities.

9. The unitary, fiber-containing composite of claim 8, wherein the third binder fibers are bicomponent, sheath-core fibers, the sheath having a first melting point, the core having a second melting point, and the first melting point is lower than the second melting point.

10. The unitary, fiber-containing composite of claim 9, wherein the sheaths of the bicomponent fibers comprise polyethylene, and the cores of the bi-component fibers comprise polypropylene.

11. The unitary, fiber-containing composite of claim 8, wherein the third linear density is 22.2 dtex or more.

12. The unitary, fiber-containing composite of claim 8, wherein the unitary fiber-containing composite further comprises:

(f) a fourth region disposed above the third region, the fourth region comprising a plurality of the second binder fibers and a plurality of the best fibers;

(g) a third transitional region disposed between the third region and the fourth region, the third transitional region comprising concentrations of the second binder fiber, the best fiber, and the third binder fiber, the concentration of the third binder fiber in the third transitional region being greatest proximate to the third region and least proximate to the fourth region, and the concentration of the second binder fiber in the third transitional region being greatest proximate to the fourth region and least proximate to the third region;

(h) a fifth region disposed above the fourth region, the fourth region comprising a plurality of the first binder fibers and a plurality of the bast fibers; and (i) a fourth transitional region disposed between the fourth region and the fifth region, the fourth transitional region comprising concentrations of the second binder fiber, the best fiber, and the first binder fiber, the concentration of the second binder fiber in the fourth transitional region being greatest proximate to the fourth region and least proximate to the fifth region, and the concentration of the first binder fiber in the fourth transitional region being greatest proximate to the fifth region and least proximate to the fourth region.

13. The unitary, fiber-containing composite of claim 12, wherein the first binder fiber, second binder fiber, and third binder fiber have a melt flow rate of about 18 g/10 min. or less.

14. The unitary, fiber-containing composite of claim 8, wherein the first binder fiber, second binder fiber, and third binder fiber have a melt flow rate of about 18 g/10 min. or less.

15. The unitary, fiber-containing composite of claim 1, wherein the first binder fiber and second binder fiber have a melt flow rate of about 18 g/10 min. or less.

16. The unitary, fiber-containing composite of claim 1, wherein the composite has a density of about 0.08 to about 1.5 $g/cm^3$.

17. The unitary, fiber-containing composite of claim 8, wherein the composite has a density of about 0.08 to about 1.5 $g/cm^3$.

18. The unitary, fiber-containing composite of claim 12, wherein the composite has a density of about 0.08 to about 1.5 $g/cm^3$.

* * * * *

UNITED STATES PATENT AND TRADEMARK OFFICE

CERTIFICATE OF CORRECTION

PATENT NO. : 7,651,964 B2
APPLICATION NO. : 11/205688
DATED : January 26, 2010
INVENTOR(S) : Thompson et al.

It is certified that error appears in the above-identified patent and that said Letters Patent is hereby corrected as shown below:

In column 11, line 53, after the word “is”, delete “6.$\underline{6}$” and replace with “6.$\overline{6}$.”

In column 11, line 55, after the word “is”, delete “6.$\underline{6}$” and replace with “6.$\overline{6}$”.

In column 11, line 55, after the word “to”, delete “22.$\underline{2}$” and replace with “22.$\overline{2}$”.

In column 12, line 18, after the word “is”, delete “22.$\underline{2}$” and replace with “22.$\overline{2}$”.

In column 12, line 24, after the word “the”, delete “best” and replace with “bast”.

In column 12, line 28, after the word “the”, delete “best” and replace with “bast”.

In column 12, line 41, after the word “the”, delete “best” and replace with “bast”.

Signed and Sealed this

Sixth Day of April, 2010

David J. Kappos
*Director of the United States Patent and Trademark Office*